Sept. 2, 1941. B. F. RANDEL Re. 21,894

MEANS AND METHOD OF REFRIGERATION

Original Filed Nov. 14, 1932 5 Sheets-Sheet 1

INVENTOR
B. F. Randel

Sept. 2, 1941. B. F. RANDEL Re. 21,894

MEANS AND METHOD OF REFRIGERATION

Original Filed Nov. 14, 1932 5 Sheets-Sheet 2

INVENTOR
Bo Folke Randel

Sept. 2, 1941. B. F. RANDEL Re. 21,894

MEANS AND METHOD OF REFRIGERATION

Original Filed Nov. 14, 1932 5 Sheets-Sheet 3

INVENTOR

B. Folke Randel

Sept. 2, 1941. B. F. RANDEL Re. 21,894

MEANS AND METHOD OF REFRIGERATION

Original Filed Nov. 14, 1932 5 Sheets-Sheet 4

INVENTOR

Bo Folke Randel

Sept. 2, 1941. B. F. RANDEL Re. 21,894

MEANS AND METHOD OF REFRIGERATION

Original Filed Nov. 14, 1932 5 Sheets-Sheet 5

INVENTOR

Bo Folke Randel

Reissued Sept. 2, 1941

Re. 21,894

UNITED STATES PATENT OFFICE 21,894

MEANS AND METHOD OF REFRIGERATION

Bo Folke Randel, San Diego, Calif.

Original No. 2,052,580, dated September 1, 1936, Serial No. 642,529, November 14, 1932. Application for reissue January 26, 1938, Serial No. 187,043

33 Claims. (Cl. 62—119.5)

(Granted under the act of March 3, 1883, as amended April 30, 1928; 370 O. G. 757)

My invention relates to the art of refrigeration, more particularly to refrigerating methods and means, wherein an inert gas is introduced in an absorption system as pressure equalizing medium. Reference is given to my pending application No. 534,773 and to United States Patents Nos. 1,882,252; 1,882,258; 1,882,254; 1,875,654; 1,922,713; and 1,915,693.

In the above application and patents, the principle of expanding a liquid refrigerant in the presence of an inert medium is clearly illustrated. In some, mechanical means is applied for the proper circulation of the mediums, and in others, internal forces are created to cause necessary circulation, especially of the inert medium. In others, no such circulation of the inert medium is required as the refrigerant will merely diffuse through this medium, which is more or less stationary.

In Patents Nos. 1,922,713 and 1,915,693, no special mention is made as to the force causing circulation of the inert medium between an evaporator and an absorber, as the illustrations plainly indicate this. The vapor mixture in the evaporator being at considerably colder temperature than the vapor mixture in an inter-connected absorber, where the temperature is more than 100 degrees higher, a circulation of the vapors will occur down through the evaporator and up through the absorber due to this difference in temperature. The pressure of the vapor mixture in all such apparatus is substantially constant through both evaporator and absorber. There is no complete separation of inert gas from the refrigerant. Assuming the use of ammonia, water and hydrogen, the pressure of the gas mixture passing from the absorber to the evaporator will be substantially the same as the pressure of the mixture passing from the evaporator to the absorber. If we assume partial pressures of 150 lbs. on hydrogen and 30 lbs. on ammonia, this will be the partial pressures both in the inlet to the absorber and in the evaporator. The vapor passing from the absorber to the evaporator is not hydrogen alone, but is a mixture of hydrogen and a small amount of ammonia, into which liquid ammonia will evaporate from its 180 lbs. pressure to its 30 lbs. partial pressure. Circulation of the gas mixture is not caused by the presence of more or less hydrogen in the evaporator and absorber, but solely by the difference in temperature in these two vessels.

My present invention covers especially a method and means to cause this circulation between an evaporator and an absorber, and also complete systems and methods of refrigeration. It may be especially applied to my apparatus as described in Patents Nos. 1,922,713 and 1,915,693. It may also be applied to many other apparatus using an inert pressure equalizing medium.

Figure 1:
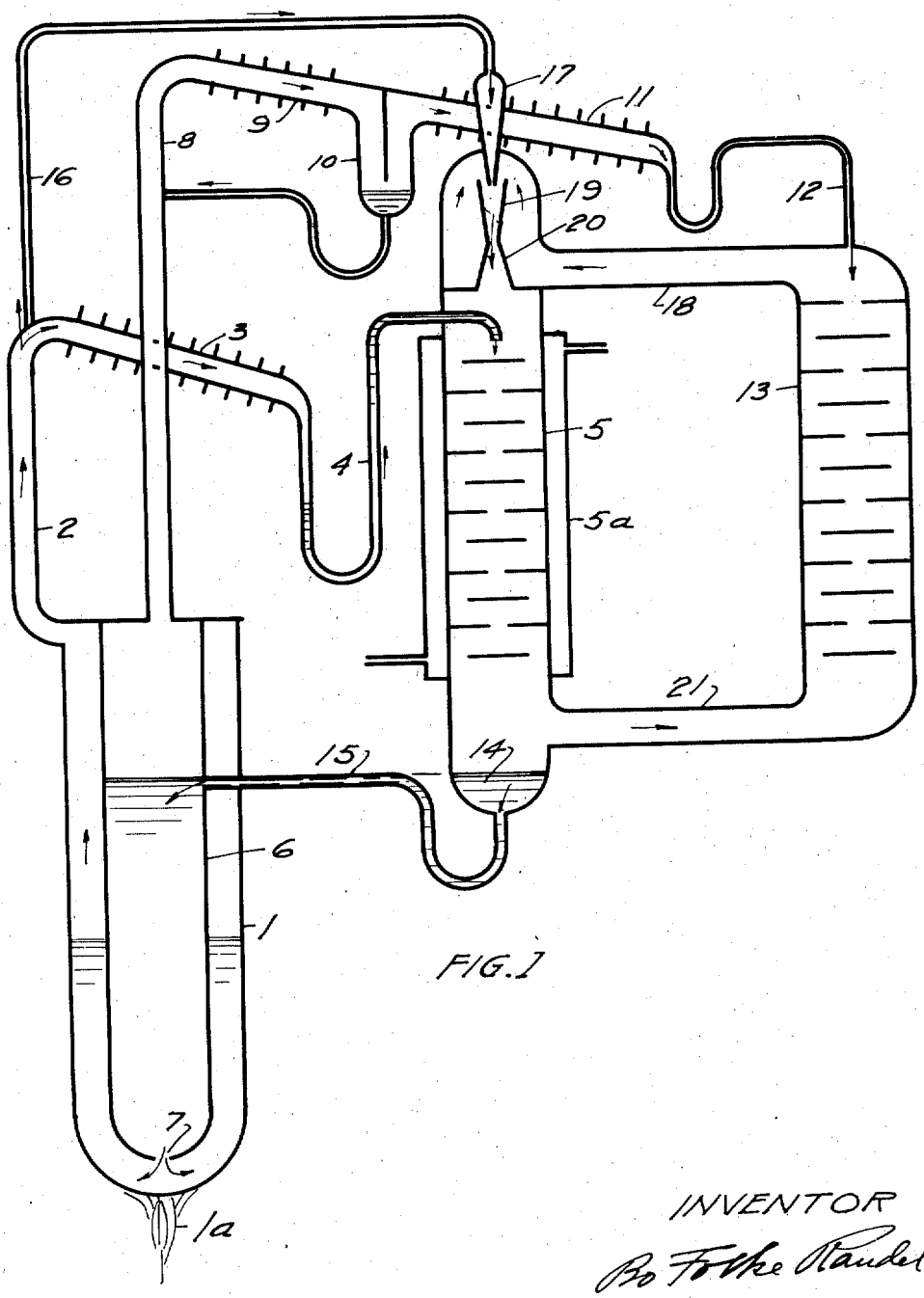
Figure 2:
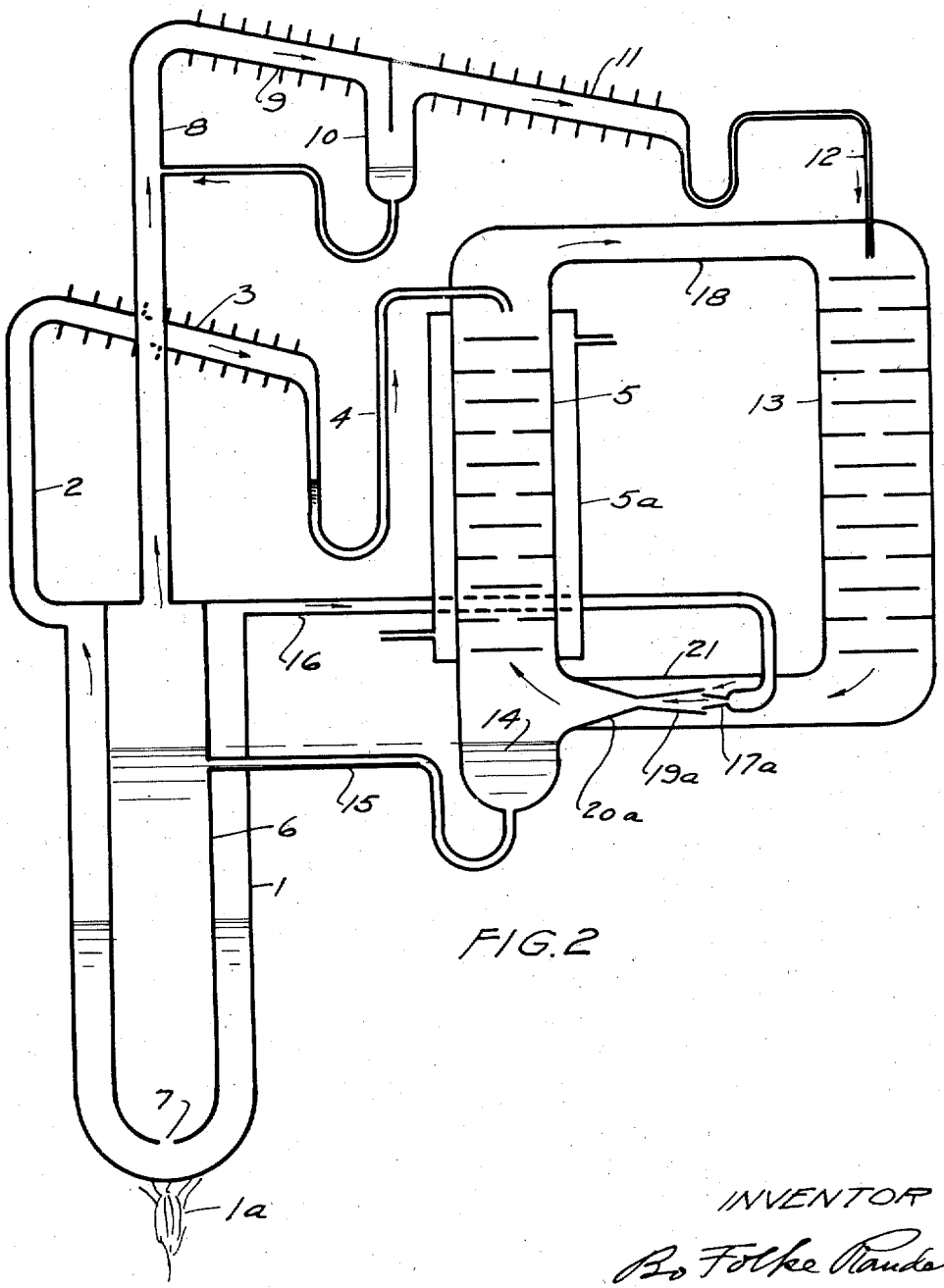
Figure 3:
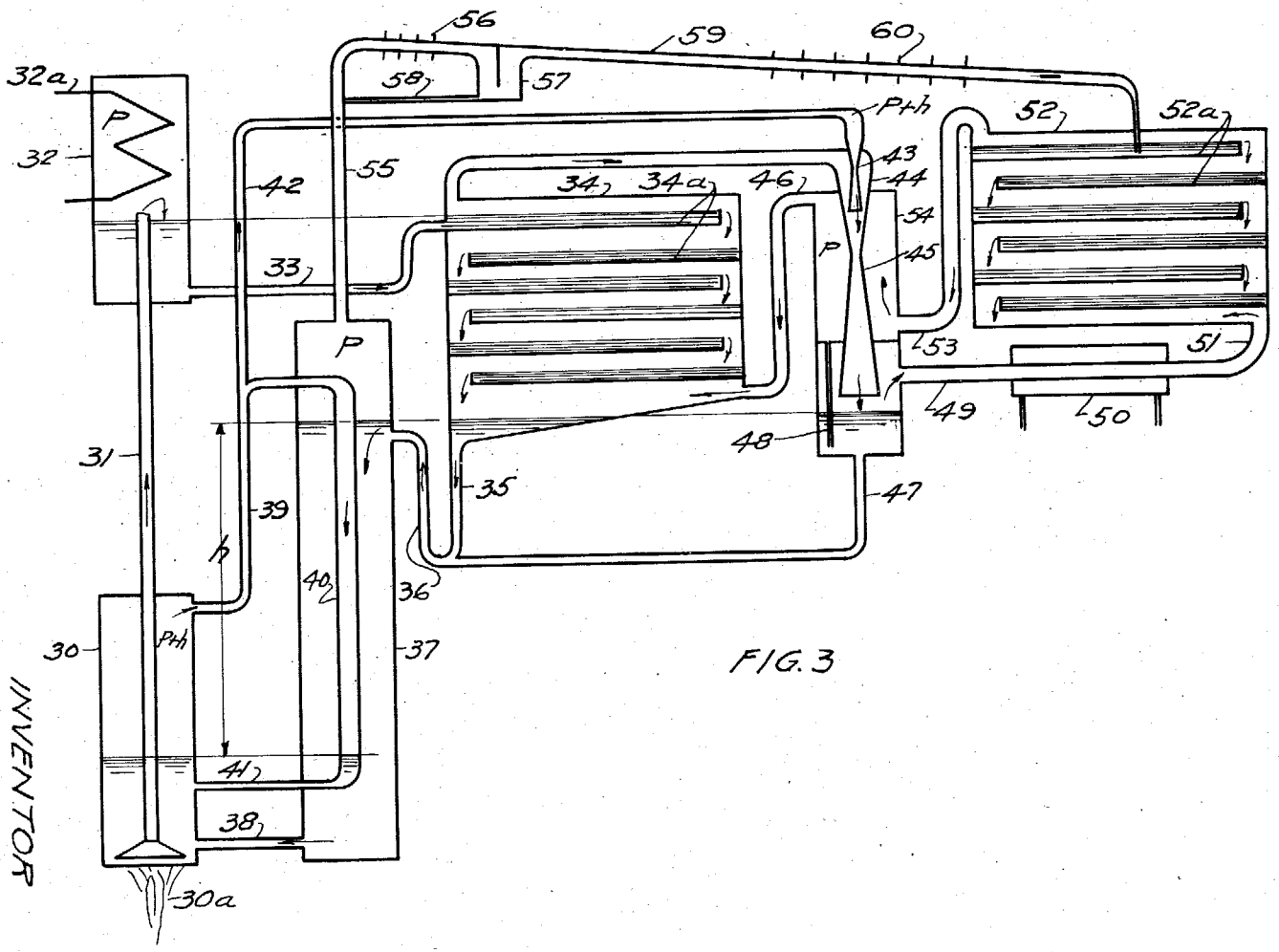
Figure 4:
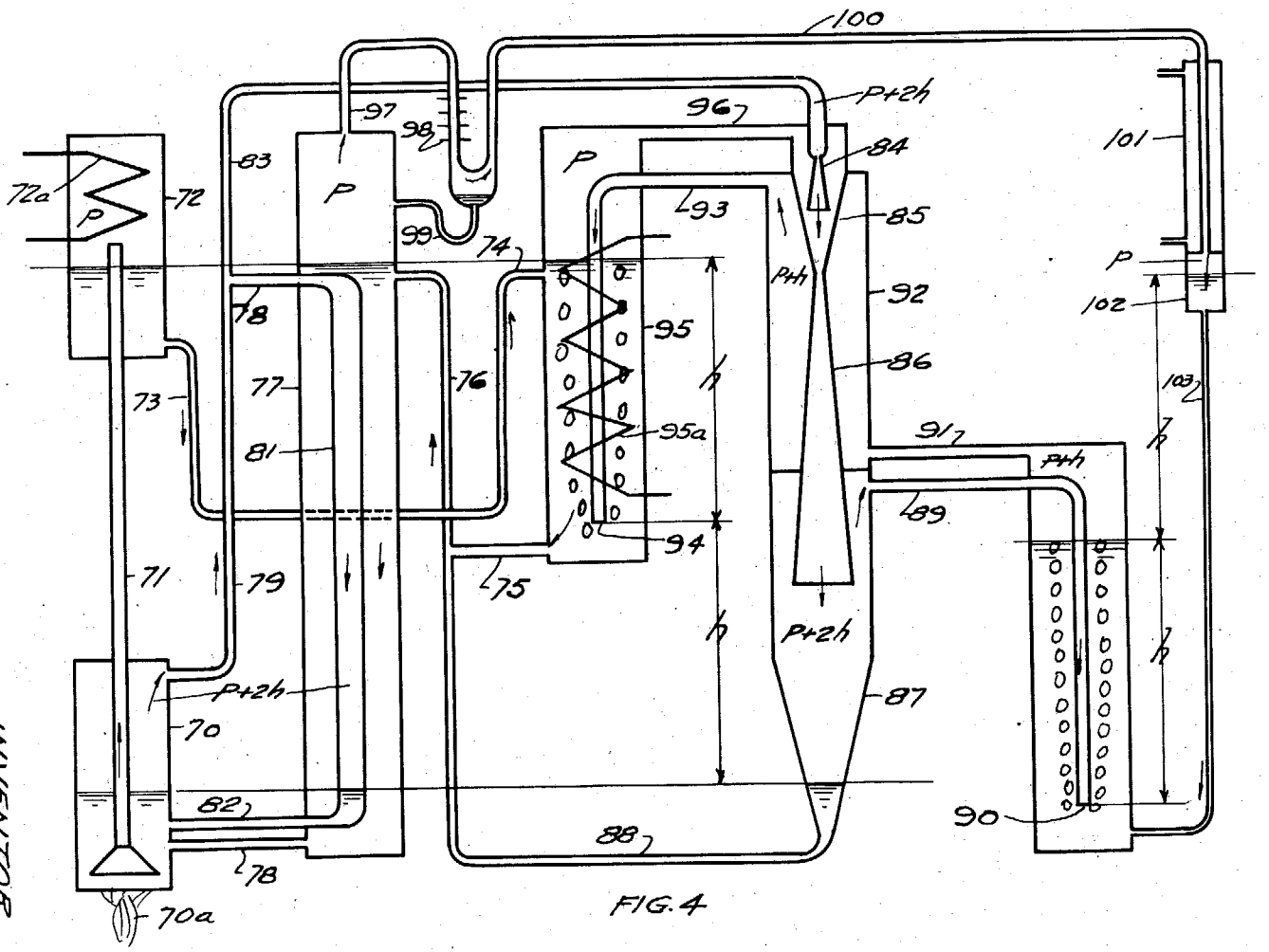

In Fig. 1, I illustrate in diagrammatic form my invention as applied to my apparatus illustrated in Patent No. 1,922,713. In Fig. 2, I illustrate a modification of apparatus as illustrated in Fig. 1. In Fig. 3, I illustrate my invention as applied to my apparatus as illustrated in my Patent No. 1,915,693. In Fig. 4, I illustrate a modification of Fig. 3, and in Fig. 5, I illustrate a modification of Fig. 2.

It is understood that my invention covers any and all other applications and also the particular step of causing a positive circulation of a gas mixture between an evaporator and an absorber.

The entire process will first be described, and then the particular step in this process which is especially disclosed in this application.

Referring to Fig. 1, generator 1, containing an absorbent as water is heated by gas flame 1a to vaporize said water, the steam rising through pipe 2 to condenser 3. The steam is here liquefied to flow through pipe 4 to absorber 5, this absorber being cooled by water, in cooling jacket 5a.

Inside absorbent generator 1 is situated refrigerant generator 6, containing a rich solution of say ammonia and water, from which solution the ammonia is driven out by the heat conducted from the absorbent generator 1. The absorbent, free of refrigerant, issues through opening 7 from 6 to 1. The refrigerant vapor is led through pipe 8, rectifier 9, separator 10, refrigerant condenser 11, pipe 12 and into evaporator 13. Evaporator 13 and absorber 5 contain an inert gas as hydrogen, and it is the evaporation of the liquid refrigerant into this inert gas, which causes refrigeration by evaporator 13.

The ammonia is reabsorbed by the water flowing through absorber, to re-form a rich solution at 14 which then flows back through pipe 15 to refrigerant generator 6.

This describes in general the cycle which also is substantially disclosed in the two patents Nos. 1,922,713 and 1,915,693.

I will now describe the additional step causing circulation between the evaporator and absorber of the mixture of refrigerant vapor and inert vapor, which step is one subject of this present application.

To cause this circulation, I utilize the well known steam injector principle, by which means steam from a boiler causes feed water to pass into this same boiler and from a lower to higher pressure.

Steam is permitted to condense and in so doing produces a partial vacuum, gaining velocity and momentum and through this momentum overcomes the pressure in the boiler.

I allow part of the steam to flow through pipe 16 to nozzle 17 enclosed in the upper part of the absorber 5. The nozzle is surrounded by the cool vapor mixture coming from the evaporator through pipe 18 and the steam is condensed by these in the mixing tube or nozzle 19. A partial vacuum is created causing a great increase in the velocity of the steam passing through nozzle 17, which increased velocity will give the condensate a momentum and force same through the mixing nozzle 19, diverging nozzle 20 and into absorber 5. This action will cause a suction effect on the vapor in pipe 18 and will force same into the absorber and thus cause a general circulation from evaporator to absorber and again back to evaporator through pipe 21.

I have shown how a part of the absorbent vapor is used to cause circulation. I may also allow all the absorbent vapor to pass through pipe 16 by eliminating condenser 3 and construct nozzle 17 as a condenser.

The operation of my apparatus as illustrated in Fig. 2 is very similar to the operation of my apparatus as illustrated in Fig. 1. The same figure notations have been used and the identical numbers in both figures refer to identical parts. The only difference between the two apparatus is the location of the injector nozzle which will cause circulation of the vapors in an opposite direction from what is indicated in Fig. 1.

The ejector nozzles have been identified as 17*a*, 19*a* and 20*a* and are enclosed in pipe 21 instead of in pipe 18 as in Fig. 1. Any further description of the operation should not be necessary.

In Fig. 3, I illustrate an application to my apparatus as illustrated in Patent No. 1,915,693. In this case I do not vaporize all the absorbent, but only so much as is required to elevate by percolator action the liquid absorbent. I also vaporize in addition so much absorbent as is required in refrigerant generator and in ejector.

Referring to Fig. 3, 30 is an absorbent generator containing an absorbent, for instance water, heated by flame 30*a*. Liquid and vapor will rise in percolator pipe 31 to a condenser 32, where, by a cooling coil, 32*a*, the vapor is condensed. The condensate with the liquid flows through pipe 33 to absorber 34, falling over trays 34*a*.

Steam generated in absorbent generator 37 passes through pipe 39, part continuing through heater 40 in refrigerant generator 37, and part continuing through pipe 42 to injector nozzles 43, 44 and 45, causing circulation of mediums from an absorber 34 to an evaporator 52. The gases pass through 44, 45, 49, 51, 52, 53, 54 and 46 back to absorber 34.

It is seen that a pressure difference represented by liquid column *h* will be created, thus enabling the steam to flow as indicated.

The refrigerant vapor after passing through rectifier 56, separator 57 and condenser 60 will drip through evaporator 52 over trays 52*a*. Any liquid passing through evaporator without vaporizing will drip back to the system through drip pipe 48. A condenser 50 is introduced to dry the inert gas and prevent steam or absorbent vapor to accompany this gas to evaporator. The condensate and the enriched solution pass through pipes 47, 35 and 36, back to refrigerant generator 37, and the condensate created in heater 40 will return to absorbent generator 30 through 41 to be mixed with absorbent from refrigerant generator passing from this to absorbent generator through pipe 38. Any further description of the apparatus should not be necessary.

Now referring to Fig. 4, the specific difference between this apparatus and the others is the provision to bubble the inert gas through a liquid refrigerant and thence to bubble the gas mixture through the absorbent. This I do by adjusting the different pressures through the apparatus.

It is seen that by starting out with a pressure P in the absorber 95 and refrigerant generator 77 above the liquid level, I will have P plus *h* pressure above the liquid in evaporator 90 and P plus 2*h* in the absorbent generator. I will thus be able to bubble the gases through the liquids as indicated.

Cooling coils 72*a* and 95*a* will cool the absorbent vapor in 72 and the liquid in 95. Ejector 34 supplied with steam will cause necessary circulation of the mediums. Any further description should not be required.

Figure 5:
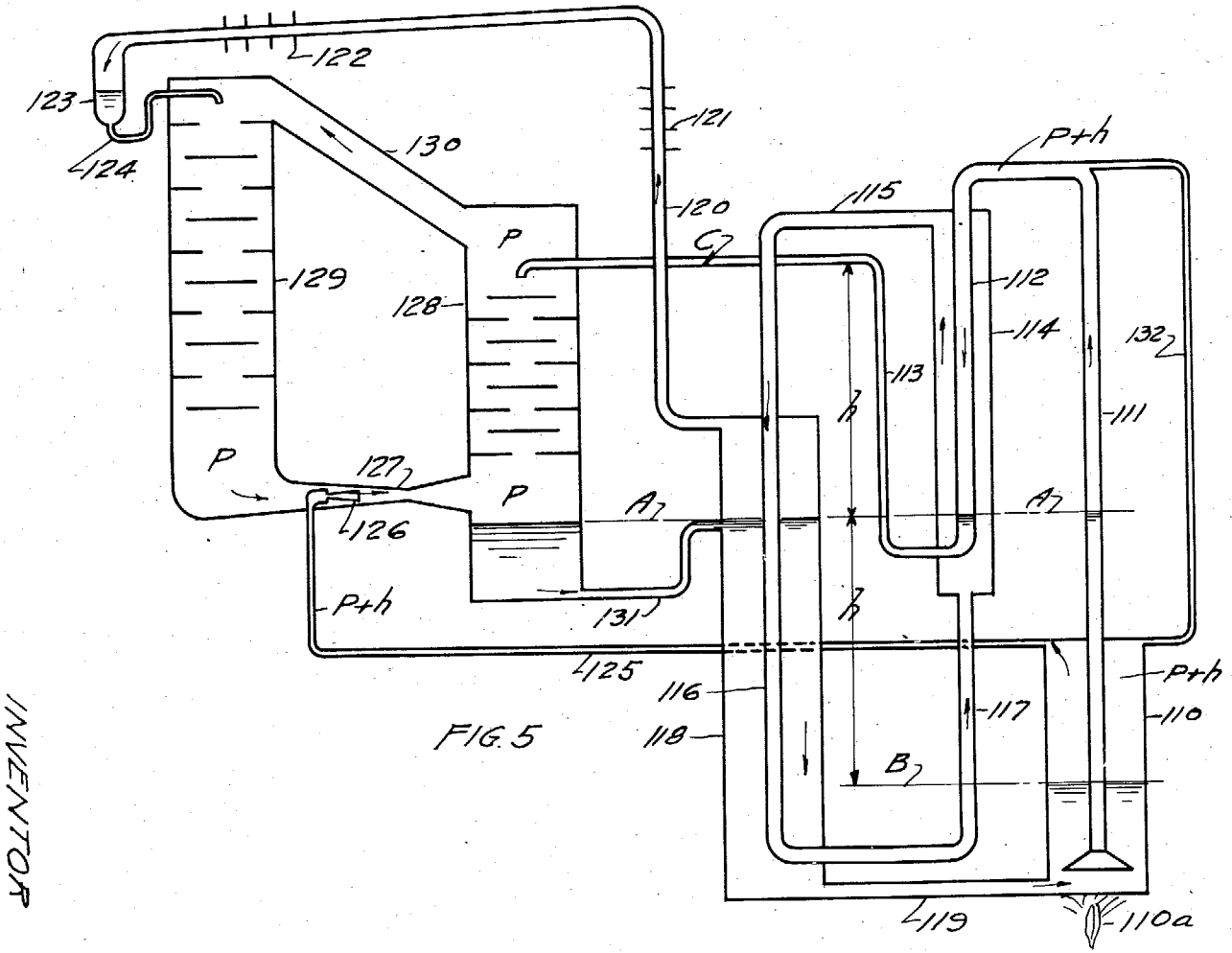

In Fig. 5 I illustrate another modification of my apparatus, as illustrated in Fig. 2. Absorbent generator 110 containing water or other absorbent liquid is heated by flame 110*a*. A mixture of steam and liquid water ascends through pipe 111 to discharge into condenser 112. It is seen that normally the liquid level is at A. Due to pressure created in generator 110 a lower level B will occur in same which will also force the liquid in pipe 113 from level A to level C. As the leg 112 is equal to the leg 111 above level A, no power will be required in the percolator as in other types where a liquid is actually raised from a lower to a higher point. Pipe 132 will maintain equal pressure in 110 and 112.

In condenser 112 any steam present will condense in passing its latent heat to the medium in surrounding vessel 114, and the accumulation of condensate and water will be forced up through pipe 113 to level C, to discharge into absorber 128.

A pressure difference represented by a liquid column *h* will be created, the absorbent generator being under P plus *h* pressure while the rest of the apparatus will be under P pressure. This pressure difference will maintain the different levels at A, B and C as indicated. It will also give a pressure P plus *h* in steam connection 125 which will force the steam through nozzle 126 causing motion of the vapors between an evaporator 129 to an absorber 128, as in the other illustrations.

In this modification I heat the solution in refrigerant generator 118 in a different manner than shown in my other illustration. The object of my special arrangement is to construct an apparatus in which the heat transferred from the vaporized absorbent at a higher point may be realized in the solution at a lower point. Ordinarily, this is of course not possible, but in my device it is possible by arranging for a heat transfer agent from the higher to the lower point.

Vessel 114 therefore contains some liquid medium, water or other, which receives the heat from the vapor in condenser 112. This vessel connects from its upper end through a loop 115, 116 and 117 with its lower end. The heated liquid in 114 will rise and cause circulation through 115, 116 and 117 back to 114. In 116 the heat will be transferred over to the solution in refrigerant generator 118, thus creating an additional force to assist in the above mentioned circulation. It is thus seen that the heat transferred from the vapor in 112 at a high point is later realized in 118 at a lower point. This will enable raising of the absorbent from the low level B to the high level C without undue expenditure of heat energy.

The refrigerant vapor passes through pipe 120, rectifier 121, condenser 122, receiver 123, pipe 124 into evaporator 129. The absorbent passes into absorber 128, thence enriched by refrigerant through pipe 131 into absorbent generator 118, and the freed absorbent through pipe 119 back to absorbent generator 110. Evaporator 129 and absorber 128 are filled with inert gas and circulation is caused by injector action in pipe 127.

I have shown and described certain apparatus and assumed certain mediums as illustrations. It is clear that I may use many other constructions, use many other heating and cooling means and many other mediums. I include any and all means and mediums suitable to carry out my invention.

The invention described herein may be manufactured and used by or for the Government of the United States of America for governmental purposes without the payment of any royalties thereon or therefor.

I claim:

1. That step in refrigeration through the agency of a generator-condenser-evaporator-absorber cycle and containing refrigerant, absorbent and pressure equalizing inert gas which comprises transferring the heat of vaporization in the absorbent vapor to a liquid heat transfer medium and then transferring this heat from said heat transfer medium to a solution of said absorbent and said refrigerant to vaporize said refrigerant out of said solution.

2. A method of refrigeration comprising vaporizing an absorbent, transferring heat of vaporization to a liquid heat transfer medium, transferring said heat from said heat transfer medium to a solution of the absorbent and a refrigerant vaporizing said refrigerant out of the solution, condensing said refrigerant vapor, vaporizing said refrigerant liquid in the presence of an inert gas forming a mixture of vapors, bringing said mixture of vapors in the presence of the first mentioned absorbent after its heat of vaporization has been transferred to the said heat transfer medium so as to absorb said refrigerant and creating a circulation of said mixture of vapors through the means of a current of absorbent vapor which is forced through an injector, the condensation of said vapor in said injector changing the heat energy into kinetic energy and thus causing a flow of the said mixture of vapors, and returning the different mediums to their respective points of beginning.

3. In an absorption refrigerating system of the two pressure type and containing an absorbent, a refrigerant and an inert gas, a method of refrigeration which comprises vaporizing the absorbent under the higher pressure, vaporizing the refrigerant out of a solution of absorbent and refrigerant under the lower pressure and by transferring the heat of absorbent vapor to the solution, by a liquid heat transfer medium condensing the refrigerant, vaporizing the refrigerant in the presence of an inert gas and under the lower pressure, separating the refrigerant from the inert gas by absorbing the refrigerant in the absorbent forming a solution, and causing circulation of the refrigerant vapor and inert gas by the means of absorbent vapor expanding from the higher to the lower pressure in an injector.

4. In the process of refrigeration through the agency of an absorption system employing a refrigerant and an absorption medium therefor and an inert pressure equalizing fluid, that step in the process which embraces the circulation of the inert fluid and the refrigerant vapor between an evaporator and an absorber which comprises, vaporizing the absorbent and utilizing a portion of said vapor to cause this said circulation and transferring the remaining portion of said absorbent to a path of flow towards the absorber.

5. That improvement in the art of refrigeration by the aid of a system containing absorbent fluid, refrigerant fluid and additional fluid for equalizing pressure which consists in vaporizing an absorbent, passing a portion of said vapor through an injector, condensing said vapor in said injector causing an increased velocity and utilizing the energy in said increased velocity to circulate a mixture of refrigerant vapor and inert gas between an absorber and an evaporator.

6. In a refrigerating apparatus, means to generate absorbent vapor, means to transfer a portion of this vapor in heat exchange relation with a refrigerant generator and another portion to an injector and other means to supply said injector with a mixture of refrigerant vapor and an inert gas.

7. That improvement in the art of refrigeration by the aid of a system containing absorbent fluid, refrigerant fluid, and additional fluid for equalizing pressure which consists in vaporizing the absorbent fluid and generating force within the system by means of a portion of said vapor and circulating said additional fluid in said system due to said force and transferring the remaining portion of said absorbent to a path of flow towards an absorber.

8. A method of refrigeration comprising, generating an absorbent vapor, condensing a portion of this absorbent vapor by transferring its heat to a solution of refrigerant and absorbent producing a refrigerant vapor, condensing a second portion of this absorbent vapor to produce absorption liquid and passing said absorption liquid through an absorber absorbing refrigerant vapor, passing a third portion of this absorbent vapor to an ejector in communication with said absorber and an evaporator in such a manner as to cause circulation of vapors between and through said absorber and said evaporator, condensing the refrigerant vapor produced in the refrigerant generator and introducing said liquid refrigerant in the said evaporator, evaporating said liquid refrigerant in the presence of an inert vapor in said evaporator, returning solution formed in said absorber to said refrigerant generator and thence the said absorbent to point of beginning.

9. A method of refrigeration, comprising heating an absorbent generator producing absorbent vapor and a thermodynamic force to elevate the remaining liquid to a higher point, utilizing part of the absorbent vapor produced to evaporate a refrigerant vapor out of a solution of refrigerant in absorbent liquid in a refrigerant generator and another part to cause circulation of vapors between and through an absorber and an evaporator, liquefying the refrigerant vapor produced and introducing said liquid into said evaporator in the presence of an inert gas and vaporizing said liquid refrigerant, allowing said absorbent liquid to fall by gravity from its elevated position through the said absorber to absorb refrigerant vapor, returning the solution formed to said refrigerant generator and said absorbent from said refrigerant generator to said absorbent generator.

10. In the process of refrigeration through the agency of an absorption system employing a refrigerant and an absorption medium therefor and an inert pressure equalizing fluid, that step in the process which embraces the circulation of the inert fluid and the refrigerant vapor between an evaporator and an absorber which comprises, vaporizing the absorbent and utilizing a portion of said vapor passing from a higher to a lower pressure to cause this said circulation and transferring the remaining portion of said absorbent to a path of flow towards the absorber.

11. That improvement in the art of refrigeration by the aid of a system containing absorbent fluid, refrigerant fluid and additional fluid for equalizing pressure, which consists in vaporizing the absorbent fluid and generating force within the system by the means of a portion of said vapor passing from a higher to a lower pressure and circulating said additional fluid in said system due to said force and transferring the remaining portion of said absorbent to a path of flow towards an absorber.

12. That improvement in the art of refrigeration by the aid of a system including an evaporator and an absorber circuit and a parallel circuit containing said absorber and an absorbent generator and containing absorbent fluid and additional pressure equalizing fluid which consists in generating force in the absorbent generator by the vaporization of the absorbent fluid, transferring a portion of said force to the evaporator-absorber circuit by passing a part of said vapor from a higher pressure in said absorbent generator to a lower pressure in said circuit and circulating the fluids in said circuit due to said force and passing the remaining part of said absorbent to a path of flow towards the absorber.

13. That improvement in the art of refrigeration by the aid of a system including an evaporator circuit and containing refrigerant fluid and additional fluid, which consists in generating a thermodynamic force outside said circuit by producing an absorbent vapor, then transferring said force to said circuit by passing a part of said vapor from a higher pressure to a lower pressure in said circuit and utilizing said transferred force to cause circulation in said circuit and transferring the remaining part of said absorbent to a path of flow towards the absorber.

14. That improvement in the art of refrigeration by the aid of a circuit including an evaporator and an absorber and containing refrigerant fluid and an additional fluid for equalizing pressure, which consists in generating force outside said circuit by the complete vaporization of liquid absorbent, introducing a portion of said vapor into said circuit to produce circulation between the absorber and the evaporator, and transferring the remainnig portion of said absorbent to a path of flow towards the absorber.

15. That improvement in the art of refrigeration by the aid of system including an evaporator and an absorber which comprises circulating vapors between and through said evaporator and said absorber by generating absorbent vapor outside said system by heat application and utilizing portions of said vapor to cause said circulation, and transferring the remaining portion of said vapor to a path of flow towards the absorber.

16. That improvement in the art of refrigeration through the agency of a generator and an absorber-condenser-evaporator circuit, which consists in generating vapor of absorbent in the generator, passing part of said vapor into the condenser in such a manner as to cause a flow of fluids from the absorber into the evaporator and passing the balance of the absorbent into said absorber.

17. That improvement in the art of refrigeration through the agency of a generator-absorber-evaporator cycle, which consists in withdrawing weak absorption liquid from the generator, vaporizing the withdrawn liquid to produce a heat source and a flow motivating force, utilizing the said heat source to vaporize liquid in the generator and utilizing said flow motivating force to circulate fluids between the evaporator and the absorber.

18. That improvement in the art of refrigeration through the agency of a first circuit consisting of a refrigerant generator-refrigerant-condenser-evaporator-absorber and a second circuit connected with said first circuit and consisting of absorbent generator-absorbent condenser- and said absorber, which consists in generating thermodynamic energy by vaporizing a liquid absorbent in said second circuit, passing said vapor into an injector within said first circuit, and condensing a part of said vapor; and utilizing said energy to cause flow of refrigerant in said first circuit and flow of fluids through the said second circuit.

19. A method of refrigeration which comprises heating liquid absorbent to cause removal of refrigerant therefrom, maintaining a body of liquid absorbent by supplying thereto liquid absorbent from which refrigerant has been removed by said heating, maintaining a body of liquid refrigerant, imposing an impelling force on inert gas to cause flow thereof, bubbling the inert gas through said body of refrigerant to cause evaporation and diffusion of refrigerant into the gas at a temperature lower than that at which refrigerant is removed from liquid absorbent by said heating, bubbling the resulting mixture of gas and refrigerant vapor through said body of liquid absorbent to cause absorption of the refrigerant vapor, and again bubbling the gas through said body of refrigerant.

20. A method of refrigeration which comprises circulating liquid absorbent in a circuit between a heated zone and a cooled zone, maintaining a body of liquid refrigerant in a part outside said circuit for liquid absorbent, circulating an inert gas by imposing an impelling force thereon, bubbling the gas through said body of refrigerant to cause evaporation and diffusion of refrigerant into the gas, then bubbling the gas through the liquid absorbent in the cooled zone whereby refrigerant is removed from the gas mixture into solution with the absorbent, and again bubbling the gas through said body of refrigerant.

21. A method of refrigeration which includes causing circulation of inert gas in a circuit having a place of evaporation and a place of absorption, evaporating refrigerant fluid in the presence of inert gas in said place of evaporation, absorbing refrigerant fluid from inert gas into liquid absorbent in said place of absorption, separating refrigerant fluid from said liquid absorbent out of the presence of said inert gas, supplying separated refrigerant fluid to said place of evaporation, causing said circulation of inert gas by propelling inert gas in said circuit by force produced outside of said circuit, and causing said inert gas to flow by liquid displacement through one or more bodies of liquid in said circuit.

22. A method of refrigeration which includes causing circulation of inert gas in a circuit having a place of evaporation and a place of absorption, evaporating refrigerant fluid in the presence of inert gas in said place of evaporation, absorbing refrigerant fluid from inert gas into liquid absorbent in said place of absorption, separating refrigerant fluid from said liquid absorbent out of the presence of inert gas, supplying separated refrigerant fluid to said place of evaporation, causing said circulation of inert gas by imposing an impelling force on inert gas in said circuit, and causing said inert gas to flow by liquid displacement through a plurality of bodies of liquid in said circuit.

23. A refrigeration system including members forming a circuit for inert gas having a place of evaporation and a place of absorption, means for supplying liquid refrigerant fluid into the presence of inert gas in said place of evaporation, means for supplying liquid absorbent into the presence of gas in said place of absorption, means for separating refrigerant fluid from said liquid absorbent out of the presence of inert gas, means operated by a force produced outside of said gas circuit for propelling inert gas in said circuit, said circuit being arranged so that said inert gas is caused to flow by liquid displacement through one or more bodies of liquid in said circuit.

24. A refrigeration system which includes members forming a circuit for inert gas having a place of evaporation and a place of absorption, means for supplying liquid absorbent into the presence of inert gas in said place of absorption, means for separating refrigerant fluid from said liquid absorbent out of the presence of inert gas, means to impose an impelling force on inert gas in said circuit to cause circulation, said circuit being arranged so that said circulating inert gas is caused to flow by liquid displacement through a plurality of bodies of liquid in said circuit.

25. A refrigeration system including a generator, an absorber, a condenser, an evaporator, and conduits connecting said parts to provide a circuit for recirculating refrigerant fluid including the generator, absorber, condenser, and evaporator, a circuit for recirculating absorption liquid including the generator and the absorber, and a circuit for recirculating inert gas including the evaporator and absorber, a gas impeller situated in the gas space of the last-named circuit and motivated to circulate the inert gas through the evaporator and absorber, said system including a liquid column balancing pressure built up by said impeller.

26. A refrigeration system including a generator, an absorber, a condenser, an evaporator, and conduits connecting said parts to provide a circuit for recirculating refrigerant fluid including the generator, absorber, condenser, and evaporator, a circuit for recirculating absorption liquid including the generator and the absorber, and a circuit for recirculating inert gas including the evaporator and absorber, a gas impeller situated in the gas space of the last-named circuit and motivated to circulate the inert gas through the evaporator and absorber, said system including a liquid column in the path of flow of inert gas reacting against the flow of inert gas whereby an appreciable pressure is built up by the impeller, said column constituting a hindrance to flow of the gas while permitting such flow.

27. A refrigeration system including a generator, an absorber, a condenser, an evaporator, and conduits connecting said parts to provide a circuit for recirculating refrigerant fluid including the generator, absorber, condenser, and evaporator, a circuit for recirculating absorption liquid including the generator and the absorber, and a circuit for recirculating inert gas including the evaporator and absorber, a gas impeller situated in the gas space of the last-named circuit and motivated to circulate the inert gas through the evaporator and absorber, said system including a liquid column in the circuit for absorption liquid and a liquid column in the circuit for inert gas, both said columns of liquid reacting against gas pressure produced by said impeller to permit the impeller to build up appreciable pressure for producing flow in the system.

28. A method of refrigeration which comprises circulating absorption liquid in a path of flow having a part adapted to be heated, forming liquid refrigerant from refrigerant vapor by condensation, conducting said liquid refrigerant in a passage having a part in which evaporation of refrigerant takes place, imposing an impelling force on inert gas to cause flow thereof in said path of flow for absorption liquid and also from a region outside said liquid refrigerant passage into the latter, the inert gas so flowing into said liquid refrigerant passage as to be capable of agitating liquid refrigerant, thereby facilitating evaporation and diffusion of refrigerant into the inert gas, and the inert gas so flowing into said path of flow for absorption liquid as to be capable of causing agitation of the absorption liquid, thereby facilitating removal of refrigerant evaporating and diffusing into the inert gas in said liquid refrigerant passage.

29. A refrigeration system including a generator, an absorber, a condenser, an evaporator, and conduits connecting the aforementioned parts to provide a circuit for recirculating refrigerant fluid including the generator, absorber, condenser and evaporator, a circuit for recirculating absorption liquid including the generator and absorber, and a gas circuit for recirculating inert gas including the evaporator and absorber, a gas impeller situated in the gas space of said gas circuit and motivated to circulate the inert gas through the evaporator and absorber, and said gas circuit containing liquid and being so constructed and arranged that said liquid resists gas circulation sufficiently for said impeller to build up pressure in said gas circuit, such resistance by the liquid to gas circulation causing the gas at the built-up pressure to effect agitation of the liquid.

30. A refrigeration system including a generator, an absorber, a condenser, an evaporator, and conduits connecting the aforementioned parts to provide a circuit for recirculating refrigerant fluid including the generator, absorber, condenser and evaporator, a circuit for recirculating absorption liquid including the generator and absorber, and a gas circuit for recirculating inert gas including the evaporator and absorber, a gas impeller situated in the gas space of said gas circuit and motivated to circulate the inert gas through the evaporator and absorber, the evaporator containing liquid refrigerant and being so constructed and arranged that said liquid acts to resist gas circulation sufficiently for said impeller to build up pressure in said gas circuit, such resistance by the liquid refrigerant to gas circulation causing the gas at the built-up pressure to effect agitation of liquid refrigerant in the evaporator.

31. A method of refrigeration which comprises circulating absorption liquid in a path of flow having a part adapted to be heated, conducting liquid refrigerant in a passage having a part in which evaporation of refrigerant takes place, imposing an impelling force on inert gas to cause flow thereof in said path of flow for absorption liquid and also from a region outside said liquid refrigerant passage into the latter, the inert gas so flowing into said liquid refrigerant passage so as to be capable of agitating liquid refrigerant, thereby facilitating evaporation and diffusion of refrigerant into the inert gas, and the inert gas so flowing into said path of flow for absorption liquid as to be capable of causing agitation of the absorption liquid, thereby facilitating removal of refrigerant evaporating and diffusing into the inert gas in said liquid refrigerant passage.

32. A refrigeration system including a generator, an absorber, an evaporator, and conduits connecting the aforementioned parts to provide a circuit for recirculating refrigerant fluid including the generator, absorber, and evaporator, a circuit for recirculating absorption liquid including the generator and absorber, and a gas circuit for recirculating inert gas including the evaporator and absorber, a gas impeller situated in the gas space of said gas circuit and motivated to circulate the inert gas through the evaporator and absorber, and said gas circuit containing liquid and being so constructed and arranged that said liquid resists gas circulation sufficiently for said impeller to build up pressure in said gas circuit, such resistance by the liquid to gas circulation causing the gas at the built-up pressure to effect agitation of the liquid.

33. A refrigeration system including a generator, an absorber, an evaporator, and conduits connecting the aforementioned parts to provide a circuit for recirculating refrigerant fluid including the generator, absorber, and evaporator, a circuit for recirculating absorption liquid including the generator and absorber, and a gas circuit for recirculating inert gas including the evaporator and absorber, a gas impeller situated in the gas space of said gas circuit and motivated to circulate the inert gas through the evaporator and absorber, the evaporator containing liquid and being so constructed and arranged that said liquid acts to resist gas circulation sufficiently for said impeller to build up pressure in said gas circuit, such resistance by the liquid to gas circulation causing the gas at the built-up pressure to effect agitation of the liquid in the evaporator.

BO FÖLKE RANDEL.